United States Patent
Aihara et al.

(10) Patent No.: US 10,825,013 B2
(45) Date of Patent: Nov. 3, 2020

(54) SYSTEMS AND METHODS FOR FACE-TO-FACE MOBILE PHONE MERCANTILE TRANSACTIONS

(75) Inventors: Toru Aihara, Kanagawa-ken (JP); Shivkumar Kalyanaraman, Bangalore (IN); Noboru Kamijo, Kanagawa-ken (JP); Koichi Kamijo, Kanagawa-ken (JP); Kiran Appasaheb Kate, Mumbai (IN); Alwyn R. Lobo, Bangalore (IN); Masana Murase, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 73 days.

(21) Appl. No.: 12/948,006

(22) Filed: Nov. 17, 2010

(65) Prior Publication Data
US 2012/0123887 A1   May 17, 2012

(51) Int. Cl.
*G06Q 20/32* (2012.01)
*G06Q 30/06* (2012.01)

(52) U.S. Cl.
CPC ......... *G06Q 20/32* (2013.01); *G06Q 20/3224* (2013.01); *G06Q 30/06* (2013.01); *G06Q 30/0601* (2013.01)

(58) Field of Classification Search
CPC .............................. G06Q 20/042; G06Q 20/32
USPC .......................................................... 705/74
See application file for complete search history.

(56) References Cited

U.S. PATENT DOCUMENTS

| | | | |
|---|---|---|---|
| 7,116,668 B2* | 10/2006 | Sivalingham | 370/394 |
| 7,254,388 B2* | 8/2007 | Nam et al. | 455/418 |
| 7,822,688 B2* | 10/2010 | Labrou et al. | 705/67 |
| 8,898,250 B2* | 11/2014 | Callahan | G06Q 30/02 709/217 |
| 2002/0123359 A1 | 9/2002 | Wei et al. | |
| 2003/0074259 A1 | 4/2003 | Slyman, Jr. et al. | |
| 2004/0059644 A1* | 3/2004 | Blau | G06Q 20/10 705/26.3 |
| 2005/0044042 A1* | 2/2005 | Mendiola et al. | 705/42 |
| 2006/0167753 A1 | 7/2006 | Teague et al. | |

(Continued)

OTHER PUBLICATIONS

"Owe Someone Money? Just Bump Your Phones" Mar 15, 2010. [Homepage of New York Times Company], [Online].Retrieved on: Jun. 21, 2020. Retrieved from: <URL: https://dialog.proquest.com/professional/docview/2218991982?accountid=131444.>(Year: 2010).*

*Primary Examiner* — Peter H Choi
*Assistant Examiner* — Monica A Mandel
(74) *Attorney, Agent, or Firm* — Ference & Associates LLC

(57) ABSTRACT

Methods and arrangements for processing face-to-face mobile phone transactions. An agreed-upon price for a product is accepted from a buyer mobile phone and a seller mobile phone. Distinct random numbers are assigned to each of the buyer and seller mobile phones. The random number assigned to the seller mobile phone is received from the buyer mobile phone, and the random number assigned to the buyer mobile phone is received from the seller mobile phone. A match is ascertained between the buyer and seller mobile phones based on receipt from the buyer mobile phone the random number assigned to the seller mobile phone and receipt from the seller mobile phone the random number assigned to the buyer mobile phone.

20 Claims, 8 Drawing Sheets

(56) References Cited

U.S. PATENT DOCUMENTS

| | | |
|---|---|---|
| 2006/0180664 A1 | 8/2006 | Barrett et al. |
| 2007/0027775 A1* | 2/2007 | Hwang .......................... 705/26 |
| 2007/0088610 A1 | 4/2007 | Chen |
| 2007/0226051 A1 | 9/2007 | Addepalli et al. |
| 2008/0103972 A1 | 5/2008 | Lanc |
| 2008/0106372 A1* | 5/2008 | Chang .......................... 340/5.8 |
| 2009/0104888 A1 | 4/2009 | Cox |
| 2009/0327130 A1* | 12/2009 | Labaton ......................... 705/41 |
| 2010/0049615 A1 | 2/2010 | Rose et al. |
| 2010/0180009 A1* | 7/2010 | Callahan ............... G06Q 30/02 709/217 |
| 2011/0039585 A1* | 2/2011 | Rouse .................. G06Q 20/102 455/466 |

* cited by examiner

SYSTEMS AND METHODS FOR FACE-TO-FACE MOBILE PHONE MERCANTILE TRANSACTIONS

BACKGROUND

Generally, face-to-face payments with mobile phones have become an exploding phenomenon in many parts of the world, including areas or regions, such as some African countries, where mobile phone consumers often purchase just basic phones without higher-end functions such as cameras or GPS. Conventional methods allow a transaction to take place where the buyer and seller exchange names or phone numbers between their phones in order to permit their identification by a server as a consensually matching pair in a mercantile exchange. However, this can lead to privacy compromises that may not be desirable to buyer or seller alike.

BRIEF SUMMARY

In summary, one aspect of the invention provides a method comprising: accepting from a buyer mobile phone and a seller mobile phone an agreed-upon price for a product; assigning distinct random numbers to each of the buyer and seller mobile phones; receiving from the buyer mobile phone the random number assigned to the seller mobile phone; receiving from the seller mobile phone the random number assigned to the buyer mobile phone; and ascertaining a match between the buyer and seller mobile phones based on receipt from the buyer mobile phone the random number assigned to the seller mobile phone and receipt from the seller mobile phone the random number assigned to the buyer mobile phone.

Another aspect of the invention provides an apparatus comprising: one or more processors; and a computer readable storage medium having computer readable program code embodied therewith and executable by the one or more processors, the computer readable program code comprising: computer readable program code configured to accept from a buyer mobile phone and a seller mobile phone an agreed-upon price for a product; computer readable program code configured to assign distinct random numbers to each of the buyer and seller mobile phones; computer readable program code configured to receive from the buyer mobile phone the random number assigned to the seller mobile phone; computer readable program code configured to receive from the seller mobile phone the random number assigned to the buyer mobile phone; and computer readable program code configured to ascertain a match between the buyer and seller mobile phones based on receipt from the buyer mobile phone the random number assigned to the seller mobile phone and receipt from the seller mobile phone the random number assigned to the buyer mobile phone.

An additional aspect of the invention provides computer program product comprising: a computer readable storage medium having computer readable program code embodied therewith, the computer readable program code comprising: computer readable program code configured to accept from a buyer mobile phone and a seller mobile phone an agreed-upon price for a product; computer readable program code configured to assign distinct random numbers to each of the buyer and seller mobile phones; computer readable program code configured to receive from the buyer mobile phone the random number assigned to the seller mobile phone; computer readable program code configured to receive from the seller mobile phone the random number assigned to the buyer mobile phone; and computer readable program code configured to ascertain a match between the buyer and seller mobile phones based on receipt from the buyer mobile phone the random number assigned to the seller mobile phone and receipt from the seller mobile phone the random number assigned to the buyer mobile phone.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
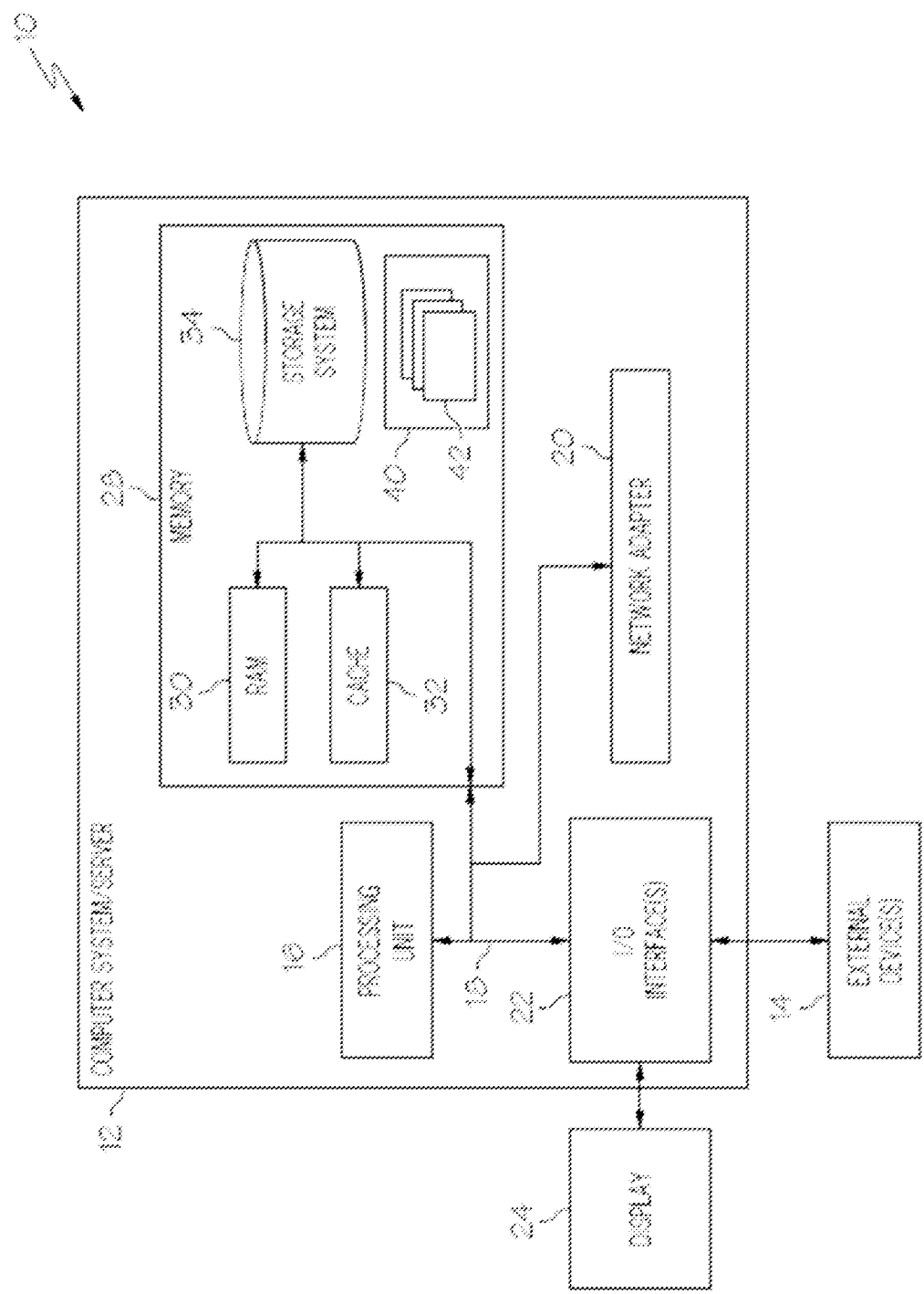
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The disclosure now turns to FIGS. 2-7. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2-7 can be performed or utilized by way of a processing unit or units and system memory such as those indicated, respectively, at 16 and 28 in FIG. 1, whether on a server computer, a client computer, a node computer in a distributed network, or any combination thereof.

Broadly contemplated herein, in accordance with at least one embodiment of the invention, are systems and methods for completing face-to-face mobile phone payments anonymously, e.g. without exposing telephone numbers, names, or nicknames, and to do so easily and securely. Methods and arrangements as contemplated herein are able to accommodate simple mobile devices, e.g., relatively "primitive" mobile phones which have only SMS and voice functions.

In accordance with at least one embodiment of the invention, and as will be appreciated more fully below, a pair of individuals (a buyer B and a seller S) agree to a price (P), whereupon both send P to a matching server (V). V counts the number of all the sellers (Ns(P)) and the buyers (Nb(P)) who send same P during a given period from a given area (e.g., a mobile phone cell ID area). V sends back a different random number to each of them in the event that Nb(P) and Ns(P) are both not equal to 1. S and B then exchange each random number and send it back to V, and V completes the accounting of the pair if each buyer/seller pair returns the random number of the other.

Further, in accordance with a variant embodiment of the invention, a pair (B and S) agree with the price (P), whereupon both send a random number request to V. V counts the number of all the sellers (Ns) and the buyers (Nb) who send random number requests during a given period from a given area, and V sends back different random number to each of them. S and B exchange each random number and send it back to V with P, and V completes the accounting of the pair if each buyer/seller pair returns the same P and random number of the other.

In order to complete a face-to-face mobile payment, the seller and buyer need not expose any private information, such as telephone numbers, names, or nicknames. Rather, the seller and buyer need only each input a short random number, instead of a long phone number of the buyer or the seller as required in some conventional arrangements.

While simple/primitive phones (e.g., SMS and voice only) are indeed supported in accordance with at least one embodiment of the invention, other phones can also be supported, such as those with a camera or with sensors such as GPS or an accelerometer. Advantageously, essentially no extra software is required in implementing methods and arrangements in accordance with at least one embodiment of the invention on a phone.

Figure 2:
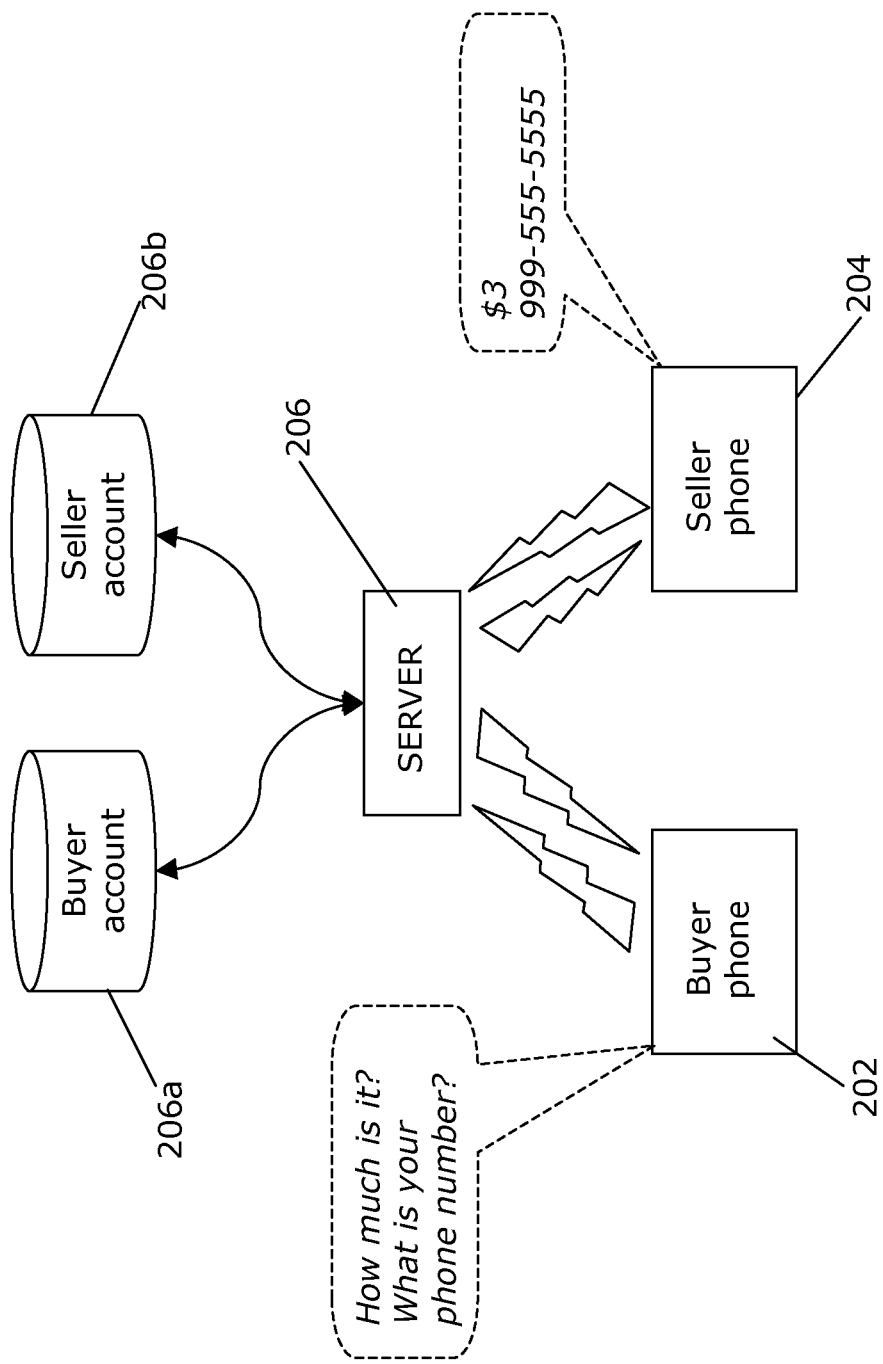
FIG. 2 schematically illustrates a conventional process of face-to-face mobile phone transactions.

FIG. 2 schematically illustrates a conventional arrangement such as the "MPESA" system widely used in Africa at present. The "MPESA" system caters to "basic" mobile phones that lack cameras and GPS and other systems beyond mere calling and texting capabilities.

As shown in accordance with the conventional arrangement shown in FIG. 2, a buyer communicates with his/her phone 202 the phone 204 of a seller, first requesting or agreeing upon a sale price and then requesting the seller's phone number. The buyer 202 then inputs the seller's (204) entire phone number to complete the sale, which is handled via a server 206 in communication with transaction accounts 206a/b of the buyer and seller, respectively. Accordingly, server 206 undertakes a final step of debiting the buyer account 206a and crediting the seller account 206b, with the buyer's inputting of the seller's phone number serving as a confirmation of their agreed-upon transactional relationship.

It can be appreciated that among the significant disadvantages of a conventional arrangement such as in FIG. 2 are the potential infringement of the seller's privacy (in view of the seller divulging his/her actual phone number), as well as the buyer's need to input the long phone number itself, which can be cumbersome and time-consuming.

Figure 3:
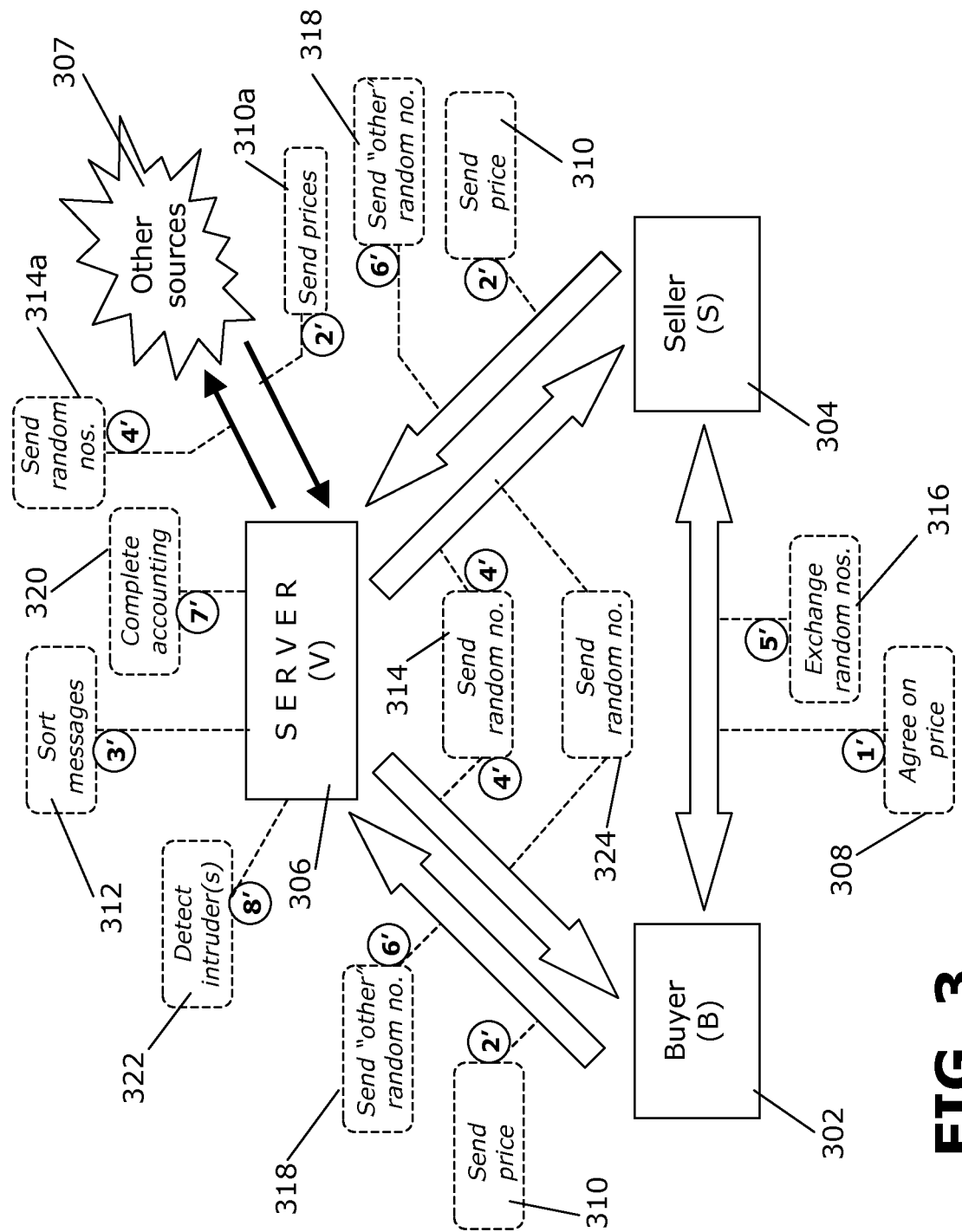
FIG. 3 schematically illustrates a process of face-to-face mobile phone transactions.
Figure 4:
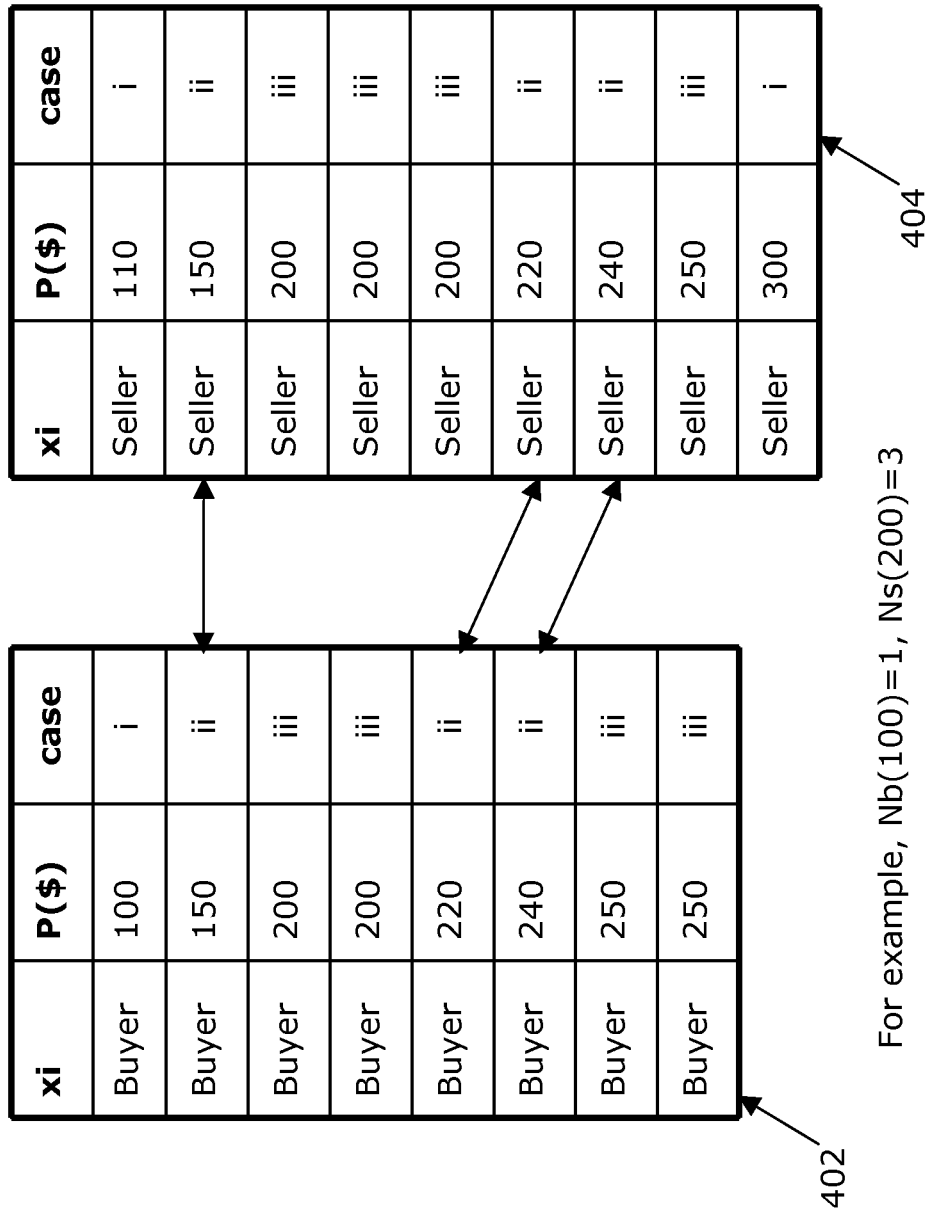
FIG. 4 provides tables of buyer and seller price information in sample transactions.

By contrast, in accordance with at least one embodiment of the present invention, as shown schematically in FIG. 3, a different scenario is contemplated for use with basic mobile phones (which typically include only voice and SMS/texting functions). A server will have knowledge of the phone number of a buyer (or sender). This scenario assumes that a buyer (B) wants to buy a product from a seller (S), but they are not acquainted with each other and they do not want to expose any personal information, e.g. name, telephone number, or even nickname. To provide a greater ease of reference, different process steps, in accordance with at least one embodiment of the invention, are sequentially ordered in FIG. 3 by way of "primed" numbers within circles (i.e., 1', 2', 3' . . . 9').

Accordingly, in a first step, in accordance with at least one embodiment of the invention, buyer 302 and seller 304 agree on a price (P) for a product (308). Buyer 302 and seller 304 then each separately send a SMS (text) to a matching server (V) 310 with information containing P. The price P can be sent as a text by itself, but also could be embedded in a larger text message, whereupon server 310 could easily extract the price from such a larger text.

In accordance with an embodiment of the invention, server 306 then sorts (312) SMS messages received not just from buyer 302 and seller 304, but also (310a) from other sources 307, during a given period from a given area based on the value of P. In other words, the messages are sorted based on price (P) and then subdivided into common time periods and geographical areas. The division by period and area acts to speed up matching by reducing the total number of the buyers and sellers need to be matched. In the present example, a mobile phone's cell-ID is used to establish that the buyer-seller pair is close. However, matching of the pair can be established in other ways, e.g., by detecting unique music played at only a certain place, from both of the members of the pair.

In accordance with an embodiment of the invention, Nb(P) and Ns(P) are defined, respectively, as the numbers of SMSes received from buyers and sellers during a given period from a given area with price P. Reference can now be made simultaneously to FIG. 4, which provides a buyer table 402 and a seller table 404. Three different scenarios are possible with the condition of prices between buyers and sellers among a group of same, namely, cases i, ii and iii as indicated in the "case" column in the tables 402/404. In case i, if Nb(P)*Ns(P)=0, V cancels the accounting of the transaction since the seller or buyer, or both, have been established not to exist in this context. In case ii, if Nb(P)=Ns(P)=1, V completes the accounting of the transaction since the buyer and seller in this case represent the only pair with the same P. Otherwise, in case iii, a price shows up at least twice on one of the buyer or seller sides 402/404, respectively, and at least once on the other of the buyer or seller sides 402/404. The process continues by way of successfully identifying one or more pairs of buyers and sellers that intend to complete a transaction together.

Accordingly, in accordance with an embodiment of the invention, and with reference again to FIG. 3, server 306 goes on to assign a different random number for each of the totality N of participating buyers and sellers still associated with price P (particularly, those buyers and sellers that have sent texts [310/310*a*] in relation to price P), wherein N=Nb(P)+Ns(P), and sends this number (314/314*a*) to each of them (that is, to the buyer 302 and seller 304 as well as to the other sources 307 as shown in FIG. 3). Server 306 assigns different random numbers, instead of common numbers, is to identify the "target" seller-buyer pair (here, seller 304 and buyer 302) uniquely. Each random number can have a length as short as $\log_c N$, where c is the number of the characters that can be used by one letter. For example, if the random number is alphanumeric and also case sensitive, c=26*2+10=62.

Accordingly, in accordance with at least one embodiment of the invention, each buyer and seller (that is, among buyer 302 and seller 304 and other sources 307 in the context of FIG. 3) receives a random number, R(B) and R(S) respectively, and each buyer/seller pair exchanges them (316). A step 318 then takes place of buyer 302 and seller 304 respectively sending to server 306 the "other" random number in the buyer-seller pair; in other words, buyer 302 sends back R(S) to server 306 and seller 304 sends back R(B) to server 306, respectively. Next, the server 306 makes a list of yi=(xi, Rr(i),R(i)), for an SMS message i, (1<=i<=Nb(P)+Ns(P)), where xi=seller or buyer, Rr(i) is the random number received by the SMS, and R(i) is the random number assigned to i.

Thus, in accordance with at least one embodiment of the invention, the server 306 is able to determine R(i) because the server 306 is able to determine the origin of an SMS while keeping a list of {(Ti,R(i))}, where Ti is the i's phone number. Server 306 finds a (seller,buyer) pair (i,j) which satisfies R(i)=Rr(j) and Rr(i)=R(j). These pairs may exist more than one at a given period at given area. Server 306 accepts all of the pairs and completes the accounting of transactions (320).

Figure 5:
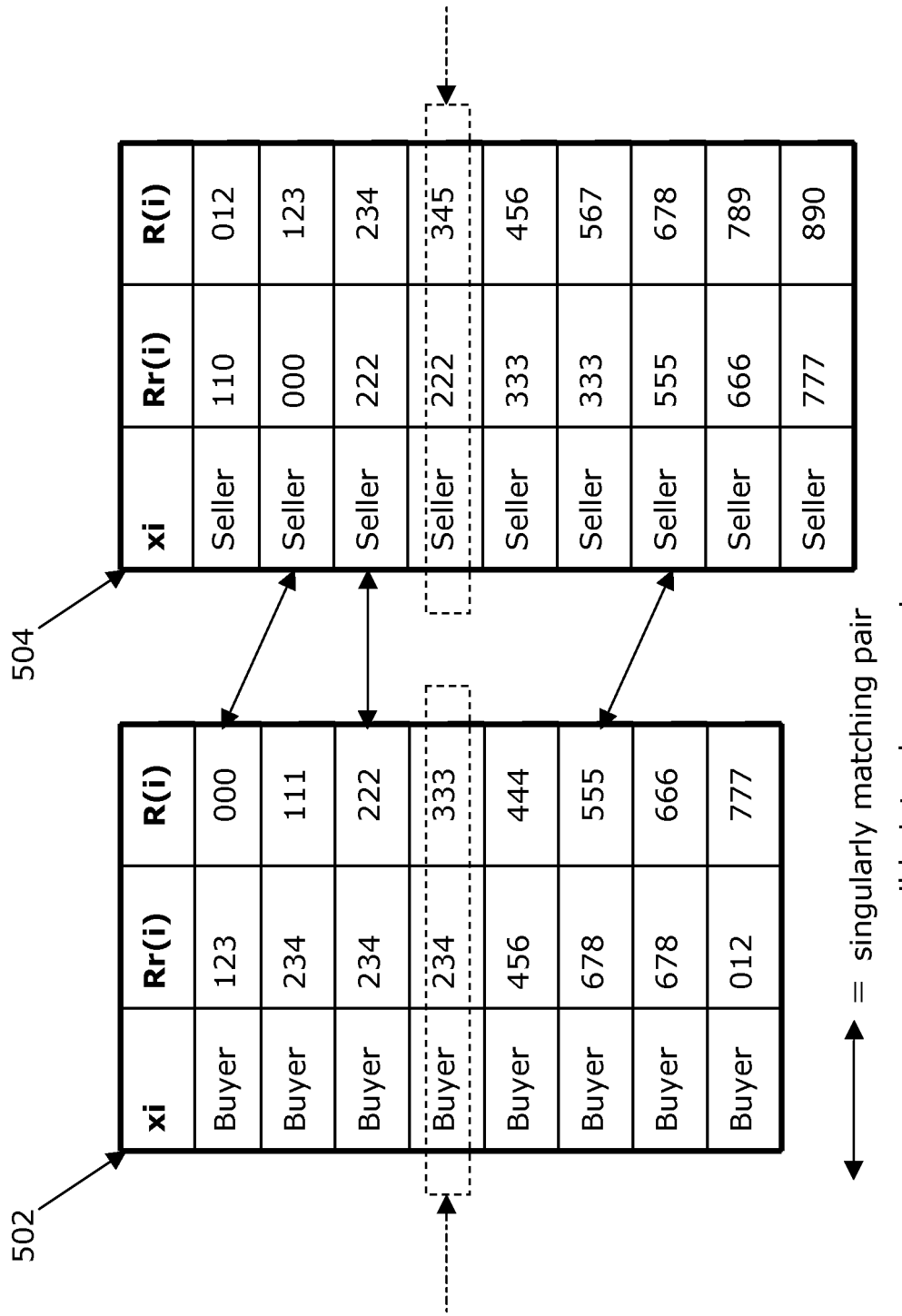
FIG. 5 provides tables of buyer and seller random numbers in sample transactions.

A process, in accordance with at least one embodiment of the invention, can determine if there is an intruder (322). For example, if the same R(i) is received from different sellers, it can be readily determined that one or more sellers may have co-opted a buyer's random number if the buyer doesn't send the seller's random number. As such, FIG. 5 illustrates a buyer table 502 and seller table 504 with such a scenario. One mismatch, or possible intruder scenario, is highlighted on each table 502/504 where a random number pair is not consistent with any pair in the opposite table.

In accordance with at least one embodiment of the invention, the server 306 may optionally send confirmation SMSes to both buyer 302 and seller 304 with P and a new random number (324), common only to that pair, to let both buyer 302 and seller 304 confirm that the pair is not incorrect.

Figure 6:
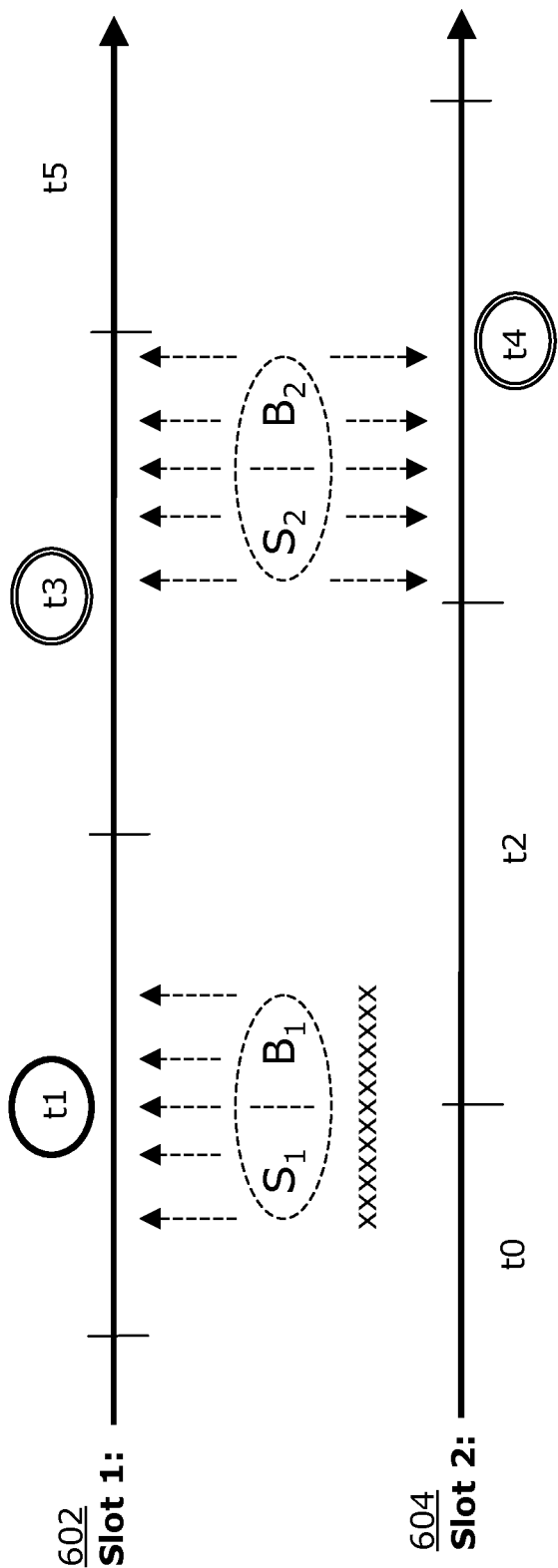
FIG. 6 schematically illustrates a variant of shifted time slots in matching a buyer and seller pair.

In accordance with a variant embodiment of the invention, and with reference to FIG. 6, the process permits a small time lag of the pair (B and S) by defining different time slots for each, wherein time slots for B are ½ period-shifted with respect to time slots for S. As shown in FIG. 6, Slot 1 (502) corresponds to such a B time slot while Slot 2 (504) corresponds to such an S time slot. If same pairs match at both slots, V abandons one of them. Accordingly, as shown, the pair $(S_1,B_1)$ matches only at t1 of Slot 1 (502) while the pair $(S_2,B_2)$ matches both at t3 of Slot 1 and t4 of Slot 2 (504). Any slot can be chosen for abandonment in this step, as it makes no difference to the practical outcome of the process.

Figure 7:
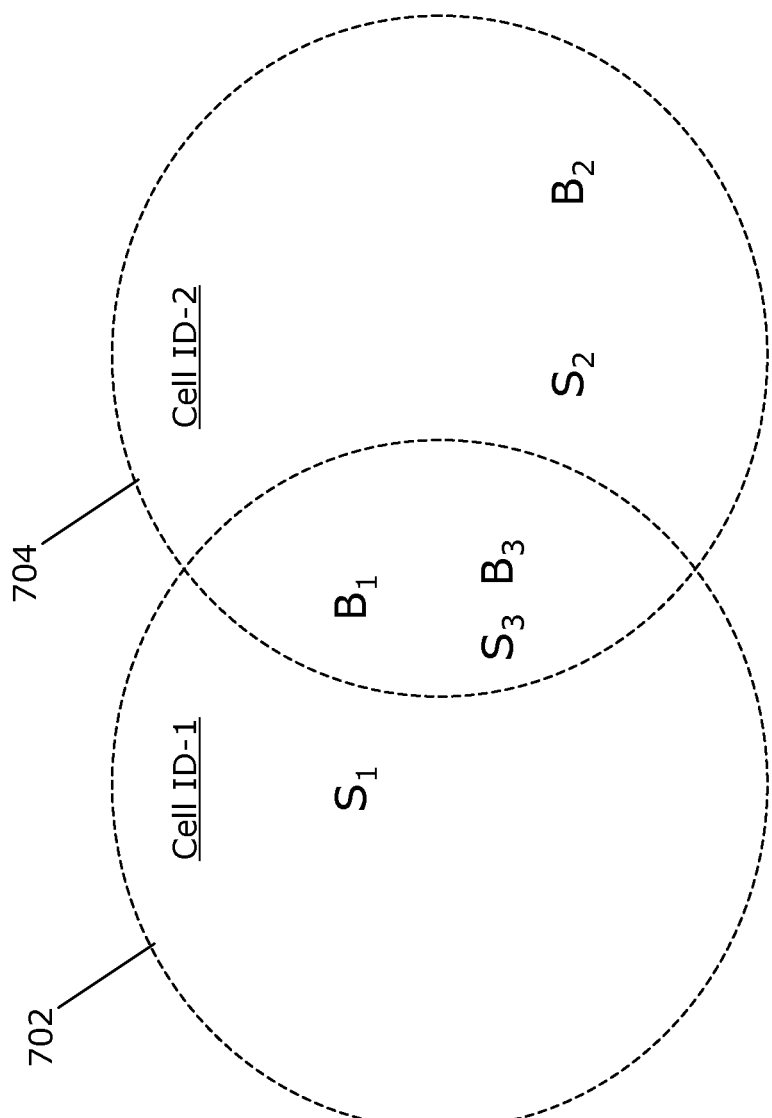
FIG. 7 schematically illustrates a variant of overlapping cell-ID areas in matching a buyer and seller pair.

In accordance with a variant embodiment of the invention, as shown in FIG. 7, the process accommodates cases in which B and S are located in different areas (e.g., mobile phone cell ID areas 702/704) by doing pair matching at all the location areas which both B and S belong to. In other words, in accordance with at least one embodiment of the invention, it is possible that a seller and buyer in a pair are located just at the border of the cells 702/704, wherein they simultaneously belong to different cell-IDs. As such, FIG. 7 shows the pair $(S_1,B_1)$ being split between with respect to Cell ID-2 (704) but together with respect to Cell ID-1 (702), while pair $(S_2,B_2)$ resides solely in Cell ID-2 (704). In both of these scenarios, matching pairs are unique to a single Cell-ID, and nothing further needs to be done. On the other hand, pair $(S_3,B_3)$ resides simultaneously in both Cell ID-1 and Cell ID-2 (702 and 704, respectively), whereupon V ends up abandoning one of these instances.

In accordance with variant embodiments of the invention, random numbers are not exchanged but the process instead attends to identification by other arrangements, such as via sound exchange, barcode reading, and/or vibrations.

In accordance with one variant embodiment of the invention, random numbers are converted by V to sound patterns (such as musical patterns), and the B and S phones exchange these sound patterns with the phones held close together and inverted with respect to one another so the sounds are easily transmitted and received between the phones. These "exchanged" sound patterns are then sent back to V, whereupon V automatically reconverts them back to seller/buyer random numbers to continue the process.

In accordance with a variant embodiment of the invention, if a camera mobile phone is employed, random numbers as discussed heretofore can be converted to a barcode, and B and S exchange them. To this end, B and S photograph each other's barcodes so that they are effectively exchanged between phones, whereupon the "exchanged" barcodes are sent back to V, and V automatically reconverts them back to seller/buyer random numbers.

For high end mobile phones with accelerometers, random numbers as discussed heretofore are converted by V to vibration patterns, and B and S touch their phones mutually, thereby transmitting vibrations between each other to essentially exchange the random numbers. These "exchanged" vibrations are then back to V, whereupon V automatically reconverts them back to seller/buyer random numbers.

If the functions available on paired mobile phones are different, then in accordance with at least one embodiment of the invention a lowest common denominator function is employed (e.g., camera if both have camera, SMS if one phone is "basic").

Communication methods between the mobile phones and the server is not limited to SMS but can be carried out by anything suitable, such as WAP (wireless access point) communication or internet/email, if supported by the mobile phones.

Figure 8:
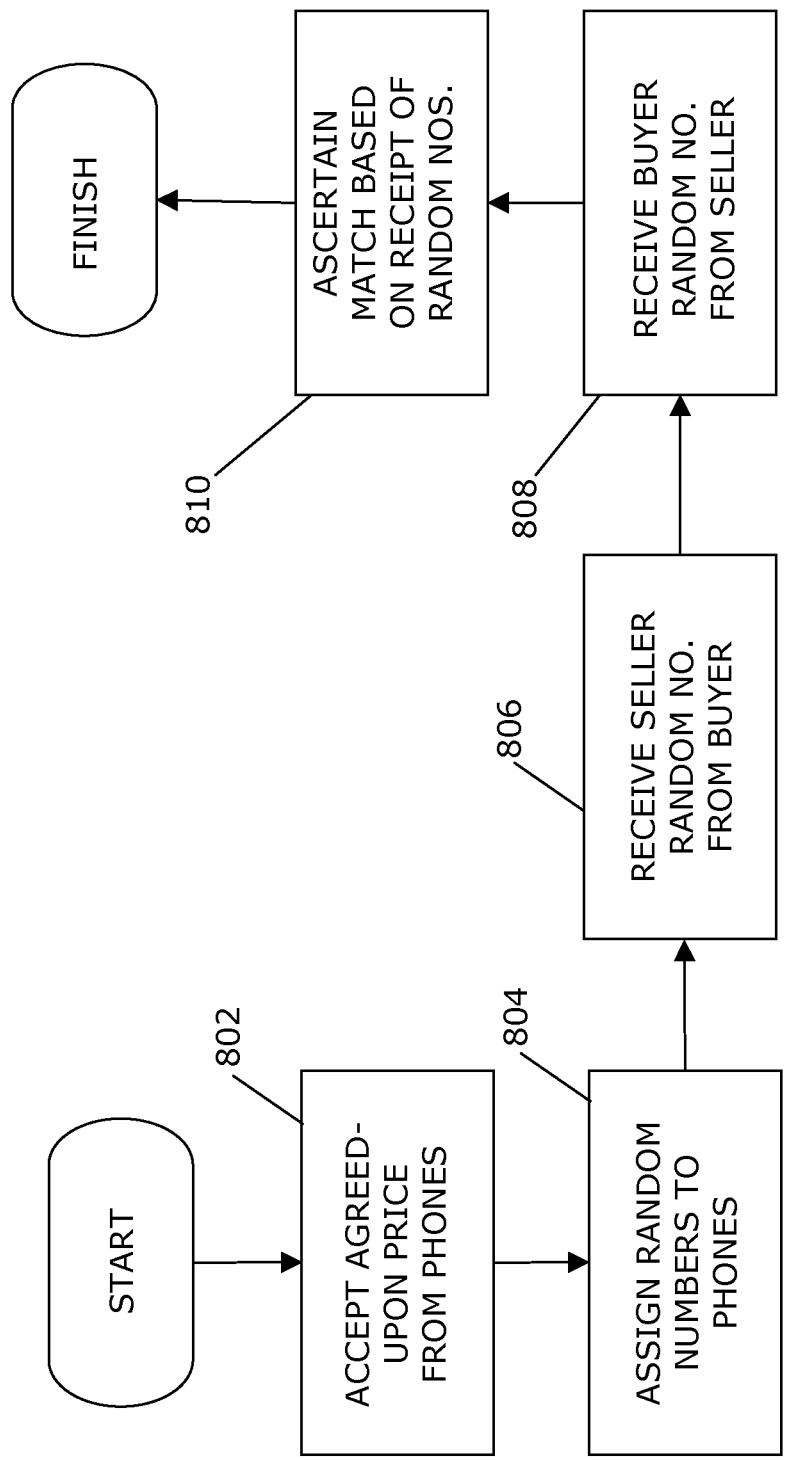
FIG. 8 sets forth a process more generally for processing a face-to-face mobile phone transaction.

FIG. 8 sets forth a process more generally for processing a face-to-face mobile phone transaction, in accordance with at least one embodiment of the invention. It should be appreciated that a process such as that broadly illustrated in FIG. 8 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 8 can be performed by way a processing unit or units and system memory such as those indicated, respectively, at 16 and 28 in FIG. 1.

As shown in FIG. 8, an agreed-upon price for a product is accepted from a buyer mobile phone and a seller mobile phone (802). Distinct random numbers are assigned to each of the buyer and seller mobile phones (804). The random number assigned to the seller mobile phone is received from the buyer mobile phone (806), and the random number assigned to the buyer mobile phone is received from the seller mobile phone (808). A match is ascertained (810) between the buyer and seller mobile phones based on receipt from the buyer mobile phone the random number assigned to the seller mobile phone and receipt from the seller mobile phone the random number assigned to the buyer mobile phone.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:

accepting, at an information handling device, a plurality of communications from a plurality of electronic devices, wherein each of the plurality of communications comprise a price and wherein a time and geographical area is associated with each of the plurality of communications and wherein each of the plurality of communications is associated with one of: a buyer mobile phone and a seller mobile phone;

identifying, at the information handling device, a subset of the plurality of communications comprising a same price, wherein the subset comprises a plurality of communications associated with buyer mobile phones and a plurality of communications associated with a seller mobile phones, wherein the buyer mobile phone and the seller mobile phone associated with a unique transaction are unknown to the information handling device;

the identifying comprising sorting the plurality of communications using the price, subdividing the sorted plurality of communications into common time periods and common geographical areas, and identifying a subset of the plurality of communications within the subdivided sorted plurality of communications comprising the same price;

generating, at the information handling device, a unique random number for each of the buyer mobile phones and each of the seller mobiles phones associated with the subset of communications and sending the unique random number to the corresponding mobile phone;

identifying, at the information handling device and from the subset, a buyer mobile phone and a seller mobile phone that correspond to a unique transaction for a product, wherein the identifying comprises ascertaining a match between the buyer and seller mobile phones based on receipt from the buyer mobile phone the unique random number sent to the seller mobile phone and receipt from the seller mobile phone the unique random number sent to the buyer mobile phone and that the buyer mobile phone and seller mobile phone both sent a communication having the same price; and identifying an intruder by receiving one of: the unique random number sent to the seller mobile phone and the unique random number sent to the buyer phone, from a mobile phone not having a corresponding match in the pair of unique numbers provided by another mobile phone.

2. The method according to claim 1, wherein said ascertaining of a match comprises:

employing two different timing patterns for the buyer and seller mobile phones, respectively, the timing patterns being period-shifted with respect to each other; and ascertaining a match with respect to accepting an agreed-upon price from the buyer mobile phone and the seller mobile phone during one predetermined time increment with respect to one of said two different timing patterns.

3. The method according to claim 2, wherein the two different timing patterns are shifted by ½-period with respect to each other.

4. The method according to claim 1, wherein said ascertaining of a match comprises:

searching two different cell-ID areas for the buyer and seller mobile phones;

finding the buyer and seller mobile phones to reside within a common one of the two different cell-ID areas; and ascertaining a match with respect to accepting an agreed-upon price from the buyer mobile phone and the seller mobile phone.

5. The method according to claim 1, further comprising converting the distinct random numbers to a converted random number selected from the group consisting of: sound patterns; two-dimensional barcodes; and vibration patterns.

6. The method of claim 5, wherein the sending the unique random number comprises sending the converted random number to the corresponding mobile phone and wherein the ascertaining a match comprises receipt of the converted random number sent to the buyer mobile phone from the seller mobile phone and receipt of the converted random number sent to the seller mobile phone from the buyer mobile phone.

7. The method according to claim 1, wherein said ascertaining of a match comprises:

employing two different timing patterns for the buyer and seller mobile phones, respectively, the timing patterns being period-shifted with respect to each other;

searching two different cell-ID areas for the buyer and seller mobile phones;

finding the buyer and seller mobile phones to reside within a common one of the two different cell-ID areas; and ascertaining a match with respect to accepting an agreed-upon price from the buyer mobile phone and the seller mobile phone during one predetermined time increment with respect to one of said two different timing patterns.

8. The method according to claim 1, further comprising:

receiving from an intruder mobile phone a number selected from the group consisting of: the first distinct random number and the second distinct random number;

sending, upon detection of the intruder, another first random number to the buyer mobile phone; and sending, upon detection of the intruder, another second random number to the seller mobile phone.

9. An apparatus comprising:

one or more processors; and
 a computer readable storage medium having computer readable program code embodied therewith and executable by the one or more processors, the computer readable program code comprising:

computer readable program code configured to accept, at an information handling device, a plurality of communications from a plurality of electronic devices, wherein each of the plurality of communications comprise a price and wherein a time and geographical area is associated with each of the plurality of communications and wherein each of the plurality of communications is associated with one of: a buyer mobile phone and a seller mobile phone;

computer readable program code configured to identify, at the information handling device, a subset of the plurality of communications comprising a same price, wherein the subset comprises a plurality of communications associated with buyer mobile phones and a plurality of communications associated with a seller mobile phones, wherein the buyer mobile phone and the seller mobile phone associated with a unique transaction are unknown to the information handling device;

the identifying comprising sorting the plurality of communications using the price, subdividing the sorted plurality of communications into common time periods and common geographical areas, and identifying a subset of the plurality of communications within the subdivided sorted plurality of communications comprising the same price;

computer readable program code configured to generate, at the information handling device, a unique random number for each of the buyer mobile phones and each of the seller mobiles phones associated with the subset of communications and sending the unique random number to the corresponding mobile phone;

computer readable program code configured to identify, at the information handling device and from the subset, a buyer mobile phone and a seller mobile phone that correspond to a unique transaction for a product, wherein the identifying comprises ascertaining a match between the buyer and seller mobile phones based on receipt from the buyer mobile phone the unique random number sent to the seller mobile phone and receipt from the seller mobile phone the unique random number sent to the buyer mobile phone and that the buyer mobile phone and seller mobile phone both sent a communication having the same price; and computer readable program code configured to identify an intruder by receiving one of: the unique random number sent to the seller mobile phone and the unique random number sent to the buyer phone, from a mobile phone not having a corresponding match in the pair of unique numbers provided by another mobile phone.

10. The apparatus according to claim 9, wherein said computer readable program code is configured to:

employ two different timing patterns for the buyer and seller mobile phones, respectively, the timing patterns being period-shifted with respect to each other; and ascertain a match with respect to accepting an agreed-upon price from the buyer mobile phone and the seller mobile phone during one predetermined time increment with respect to one of said two different timing patterns.

11. The apparatus according to claim 10, wherein the two different timing patterns are shifted by ½-period with respect to each other.

12. The apparatus according to claim 9, wherein said computer readable program code is configured to:

search two different cell-ID areas for the buyer and seller mobile phones;

find the buyer and seller mobile phones to reside within a common one of the two different cell-ID areas; and ascertain a match with respect to accepting an agreed-upon price from the buyer mobile phone and the seller mobile phone.

13. The apparatus according to claim 9, wherein said computer readable program code is further configured to convert the distinct random numbers to one from the group consisting of: sound patterns; two-dimensional barcodes; and vibration patterns.

14. The apparatus according to claim 9, wherein the plurality of communications comprises texts.

15. A computer program product comprising:

a non-transitory computer readable storage medium having computer readable program code embodied therewith, the computer readable program code comprising:

computer readable program code configured to accept, at an information handling device, a plurality of communications from a plurality of electronic devices, wherein each of the plurality of communications comprise a price and wherein a time and geographical area is associated with each of the plurality of communications and wherein each of the plurality of communications is associated with one of: a buyer mobile phone and a seller mobile phone;

computer readable program code configured to identify, at the information handling device, a subset of the plurality of communications comprising a same price, wherein the subset comprises a plurality of communications associated with buyer mobile phones and a plurality of communications associated with a seller mobile phones, wherein the buyer mobile phone and the seller mobile phone associated with a unique transaction are unknown to the information handling device;

the identifying comprising sorting the plurality of communications using the price, subdividing the sorted plurality of communications into common time periods and common geographical areas, and identifying a subset of the plurality of communications within the subdivided sorted plurality of communications comprising the same price;

computer readable program code configured to generate, at the information handling device, a unique random number for each of the buyer mobile phones and each of the seller mobiles phones associated with the subset of communications and sending the unique random number to the corresponding mobile phone;

computer readable program code configured to identify, at the information handling device and from the subset, a buyer mobile phone and a seller mobile phone that correspond to a unique transaction for a product, wherein the identifying comprises ascertaining a match between the buyer and seller mobile phones based on receipt from the buyer mobile phone the unique random number sent to the seller mobile phone and receipt from the seller mobile phone the unique random number sent to the buyer mobile phone and that the buyer mobile phone and seller mobile phone both sent a communication having the same price; and computer readable program code configured to identify an intruder by receiving one of: the unique random number sent to the seller mobile phone and the unique random number sent to the buyer phone, from a mobile phone not having a corresponding match in the pair of unique numbers provided by another mobile phone.

16. The computer program product according to claim 15, wherein said computer readable program code is configured to:

employ two different timing patterns for the buyer and seller mobile phones, respectively, the timing patterns being period-shifted with respect to each other; and ascertain a match with respect to accepting an agreed-upon price from the buyer mobile phone and the seller mobile phone during one predetermined time increment with respect to one of said two different timing patterns.

17. The computer program product according to claim 16, wherein the two different timing patterns are shifted by ½-period with respect to each other.

18. The computer program product according to claim 15, wherein said computer readable program code is configured to:

search two different cell-ID areas for the buyer and seller mobile phones;

find the buyer and seller mobile phones to reside within a common one of the two different cell-ID areas; and ascertain a match with respect to accepting an agreed-upon price from the buyer mobile phone and the seller mobile phone.

19. The computer program product according to claim 15, wherein said computer readable program code is further configured to convert the distinct random numbers to one from the group consisting of: sound patterns; two-dimensional barcodes; and vibration patterns.

20. The computer program product according to claim 15, wherein the plurality of communications comprise texts.

* * * * *